(12) United States Patent
Pinciuc et al.

(10) Patent No.: US 12,300,428 B2
(45) Date of Patent: *May 13, 2025

(54) DUAL MODE WIRELESS POWER SYSTEM DESIGNS

(71) Applicant: Apple Inc., Cupertino, CA (US)

(72) Inventors: Christopher M. Pinciuc, Cupertino, CA (US); Daniel T. McDonald, San Jose, CA (US); Tao Pan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/407,220

(22) Filed: Jan. 8, 2024

(65) Prior Publication Data

US 2024/0266107 A1    Aug. 8, 2024

Related U.S. Application Data

(63) Continuation of application No. 17/984,666, filed on Nov. 10, 2022, now Pat. No. 11,887,775, which is a
(Continued)

(51) Int. Cl.
*H01F 38/14* (2006.01)
*H01F 27/36* (2006.01)
(Continued)

(52) U.S. Cl.
CPC .......... *H01F 38/14* (2013.01); *H01F 27/361* (2020.08); *H01F 27/366* (2020.08);
(Continued)

(58) Field of Classification Search
CPC ........ H01F 38/14; H01F 27/36; H01F 7/0252; H01F 27/288; H02J 50/10; H02J 7/025; H02J 7/02; H02J 7/0042
See application file for complete search history.

(56) References Cited

U.S. PATENT DOCUMENTS 11,515,083 B2    11/2022    Pinciuc et al.
11,887,775 B2    1/2024    Pinciuc et al.
(Continued)

FOREIGN PATENT DOCUMENTS

CN    208112313 U    11/2018
EP    3185261 A1    6/2017
(Continued)

OTHER PUBLICATIONS

"Metglass Safety Data Sheet Metglas 2605S3A Iron Base Magnetic Core", Metglass, Inc., Metglass.com, 2016, pp. 1-8.
(Continued)

*Primary Examiner* — Stacy Whitmore
(74) *Attorney, Agent, or Firm* — Kilpatrick Townsend & Stockton LLP

(57) ABSTRACT

Electronic devices according to embodiments of the present technology may include a battery. The devices may include a nanocrystalline foil. The devices may include a wireless charging coil seated on the nanocrystalline foil. The devices may also include an integrated circuit configured to operate the wireless charging coil in a wireless charging transmission mode.

20 Claims, 5 Drawing Sheets

Related U.S. Application Data continuation of application No. 16/559,932, filed on Sep. 4, 2019, now Pat. No. 11,515,083.

(60) Provisional application No. 62/737,284, filed on Sep. 27, 2018.

(51) Int. Cl.
*H02J 7/00* (2006.01)
*H02J 7/02* (2016.01)
*H02J 50/10* (2016.01)

(52) U.S. Cl.
CPC ............ *H02J 7/0042* (2013.01); *H02J 50/10* (2016.02); *H02J 7/02* (2013.01)

(56) References Cited

U.S. PATENT DOCUMENTS

| | | | |
|---|---|---|---|
| 2010/0081483 A1 | 4/2010 | Chatterjee et al. | |
| 2011/0068283 A1 | 3/2011 | Lu et al. | |
| 2012/0319647 A1 | 12/2012 | Itabashi et al. | |
| 2014/0171157 A1 | 6/2014 | Ho | |
| 2015/0115723 A1 | 4/2015 | Levo et al. | |
| 2016/0036245 A1 | 2/2016 | Chang et al. | |
| 2016/0056664 A1 | 2/2016 | Partovi | |
| 2016/0109852 A1 | 4/2016 | Kuwabara et al. | |
| 2016/0344222 A1* | 11/2016 | Lee | H02J 50/70 |
| 2017/0178800 A1 | 6/2017 | Muratov | |
| 2018/0171444 A1 | 6/2018 | Kwon et al. | |
| 2018/0286550 A1 | 10/2018 | Nakahata et al. | |
| 2018/0286575 A1 | 10/2018 | Kyeong et al. | |
| 2019/0363565 A1 | 11/2019 | Graham et al. | |
| 2020/0105465 A1 | 4/2020 | Pinciuc et al. | |
| 2020/0204004 A1 | 6/2020 | Jang | |
| 2020/0212726 A1 | 7/2020 | Hwang | |
| 2020/0328024 A1 | 10/2020 | Kim et al. | |

FOREIGN PATENT DOCUMENTS

| | | | |
|---|---|---|---|
| WO | 2009122355 A2 | 10/2009 | |
| WO | 2012099965 A2 | 7/2012 | |
| WO | 2013142720 A1 | 9/2013 | |
| WO | 2016072779 A1 | 5/2016 | |
| WO | 2016140534 A1 | 9/2016 | |
| WO | 2016190688 A1 | 12/2016 | |
| WO | 2017135687 A1 | 8/2017 | |
| WO | 2017209481 A1 | 12/2017 | |
| WO | 2018048281 A1 | 3/2018 | |
| WO | 2018100975 A1 | 6/2018 | |
| WO | 2018147649 A1 | 8/2018 | |
| WO | 2019231142 A1 | 12/2019 | |

OTHER PUBLICATIONS

U.S. Appl. No. 16/559,932 , Non-Final Office Action, Mailed on Jan. 27, 2022, 12 pages.
U.S. Appl. No. 16/559,932 , Notice of Allowance, Mailed on Jul. 29, 2022, 8 pages.
U.S. Appl. No. 17/984,666 , Non-Final Office Action, Mailed on May 9, 2023, 11 pages.
U.S. Appl. No. 17/984,666 , Notice of Allowance, Mailed on Sep. 6, 2023, 5 pages.
International Patent Application No. PCT/US2019/049673 , International Preliminary Report on Patentability, Mailed on Apr. 8, 2021, 12 pages.
International Patent Application No. PCT/US2019/049673 , International Search Report and Written Opinion, Mailed on Jan. 7, 2020, 16 pages.

* cited by examiner

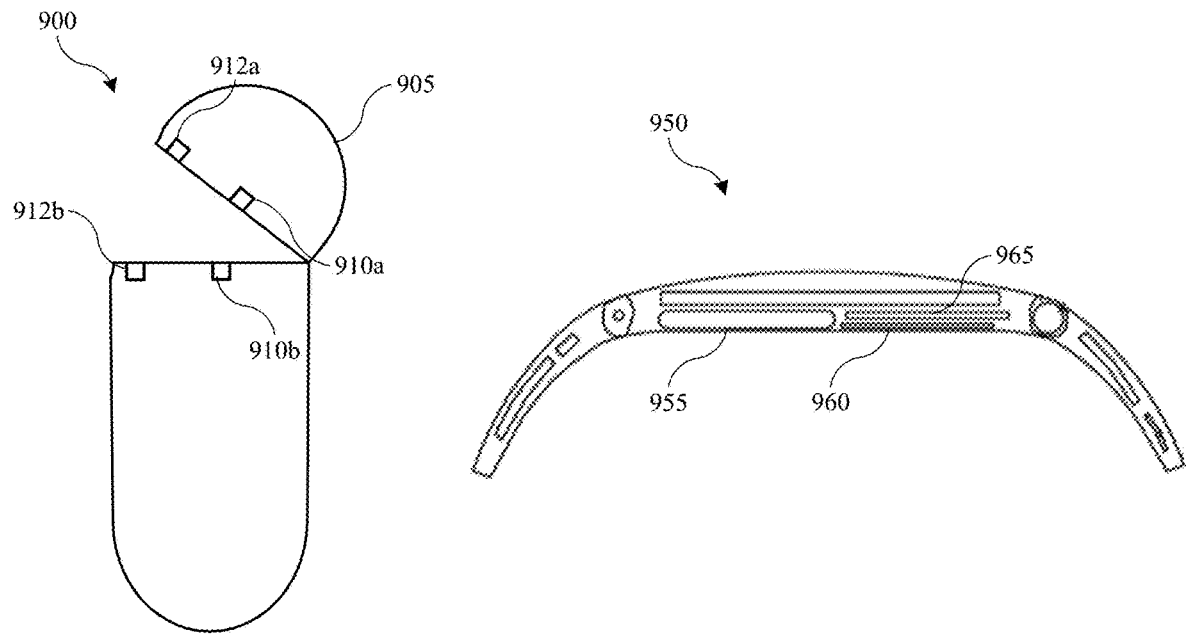
FIG. 9A  FIG. 9B
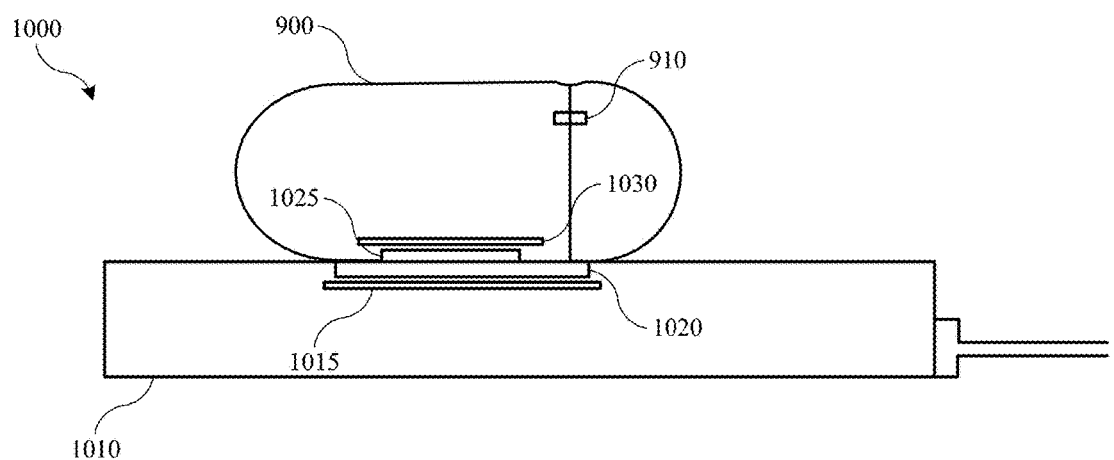
FIG. 10

DUAL MODE WIRELESS POWER SYSTEM DESIGNS

CROSS-REFERENCE TO RELATED APPLICATIONS

This application is a continuation of U.S. application Ser. No. 17/984,666, filed Nov. 10, 2022, which is a continuation of U.S. application Ser. No. 16/559,932, filed Sep. 4, 2019, now U.S. Pat. No. 11,515,083, which claims priority to and the benefit of U.S. Provisional Application No. 62/737,284, filed Sep. 27, 2018, which are incorporated by reference.

TECHNICAL FIELD

The present technology relates to wireless charging systems. More specifically, the present technology relates to wireless charging system configurations, components, and characteristics.

BACKGROUND

Wireless charging is being incorporated with a variety of devices. As electronic devices in which wireless charging components are housed reduce in size, the available space for materials may be limited, which may affect operational performance.

SUMMARY

Electronic devices according to embodiments of the present technology may include a battery. The devices may include a nanocrystalline foil. The devices may include a wireless charging coil seated on the nanocrystalline foil. The devices may also include an integrated circuit that may be configured to operate the wireless charging coil in a wireless charging transmission mode.

In some embodiments, the nanocrystalline foil may include multiple layers of a ferrosilicon-containing material, and each layer may be characterized by a thickness of less than or about 50 µm. The nanocrystalline foil may include between about 2 and about 10 layers of the ferrosilicon-containing material. The wireless charging coil may be characterized by an annular shape comprising an inner annular radius defining an interior cylindrical volume. Additional layers of the ferrosilicon-containing material may be disposed within the interior cylindrical volume. The ferrosilicon-containing material may be characterized by a permeability of greater than or about 1,000 $\mu_0$ at a thickness of the nanocrystalline foil of less than or about 250 µm. The ferrosilicon-containing material may be characterized by a flux density saturation of greater than or about 500 mT at a thickness of the nanocrystalline foil of less than or about 250 µm. The integrated circuit may be further configured to receive wireless power using the wireless power coil and charge the battery using the received wireless power. The nanocrystalline foil may be configured to maintain a flux density below or about 50% of a saturation value when the wireless charging coil is receiving wireless power from a misaligned wireless power transmission coil. The electronic device may be or include a mobile phone or a tablet.

Some embodiments of the present technology may also encompass electronic devices. The electronic devices may include a graphical display. The electronic devices may include a nanocrystalline foil defining a recessed annular ledge. The electronic devices may include an annular wireless charging coil seated on the recessed annular ledge, where the coil may be characterized by a thickness of less than or about 100 µm. The electronic devices may include an e-shield positioned across the annular wireless charging coil. The electronic devices may include an integrated circuit configured to operate the annular wireless charging coil in a wireless charging transmission mode.

In some embodiments, the nanocrystalline foil may include multiple layers of a ferrosilicon-containing material. Each layer of the nanocrystalline foil may be characterized by a thickness of less than or about 50 µm. The nanocrystalline foil may include between about 2 and about 10 layers of the ferrosilicon-containing material. The nanocrystalline foil comprises between about 3 layers and about 5 layers of the ferrosilicon-containing material on which the annular wireless charging coil is seated, and wherein the nanocrystalline foil comprises at least about 2 layers of the ferrosilicon-containing material extending through the coil. The ferrosilicon-containing material may be characterized by a permeability of greater than or about 1,000 $\mu_0$ at a thickness of the nanocrystalline foil of less than or about 250 µm. The ferrosilicon-containing material may be characterized by a flux density saturation of greater than or about 500 mT at a thickness of the nanocrystalline foil of less than or about 250 µm.

Some embodiments of the present technology may also encompass a wireless charging system. The wireless charging system may include a first electronic device including a battery, a nanocrystalline foil, and a first wireless charging coil seated on the nanocrystalline foil. The first electronic device may also include an integrated circuit configured to operate the first wireless charging coil in a wireless charging transmission mode. The wireless charging system may also include a second electronic device that may include a second wireless charging coil configured to operate in a wireless charging receiving mode. The second electronic device may also include at least one hard magnet within the second electronic device.

In some embodiments, the second electronic device may include a case incorporating the wireless charging receiving coil. The case may include a hinged lid and at least one pair of hard magnets operable to retain the hinged lid closed via magnetic attraction between the at least one pair of hard magnets. The second electronic device may include a wearable device, and the wearable device may also include a nanocrystalline foil positioned adjacent the second wireless charging coil. The nanocrystalline foil may include multiple layers of a ferrosilicon-containing material. Each layer of the ferrosilicon-containing material may be characterized by a thickness of less than or about 50 µm. The ferrosilicon-containing material may be characterized by a permeability of greater than or about 1,000 $\mu_0$ at a thickness of the nanocrystalline foil of less than or about 250 µm, and the ferrosilicon-containing material may be characterized by a flux density saturation of greater than or about 500 mT at a thickness of the nanocrystalline foil of less than or about 250 µm.

Such technology may provide numerous benefits over conventional technology. For example, the present systems may produce improved charging efficiency for wireless transmission devices. Additionally, components of the present technology may have improved flux density saturation and permeability capabilities over conventional materials. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

FIGS. 9A-9B show a schematic illustrations of chargeable devices according to some embodiments of the present technology.

FIG. 10 shows a schematic cross-sectional view of a wireless charging system according to some embodiments of the present technology.

Figure 1:
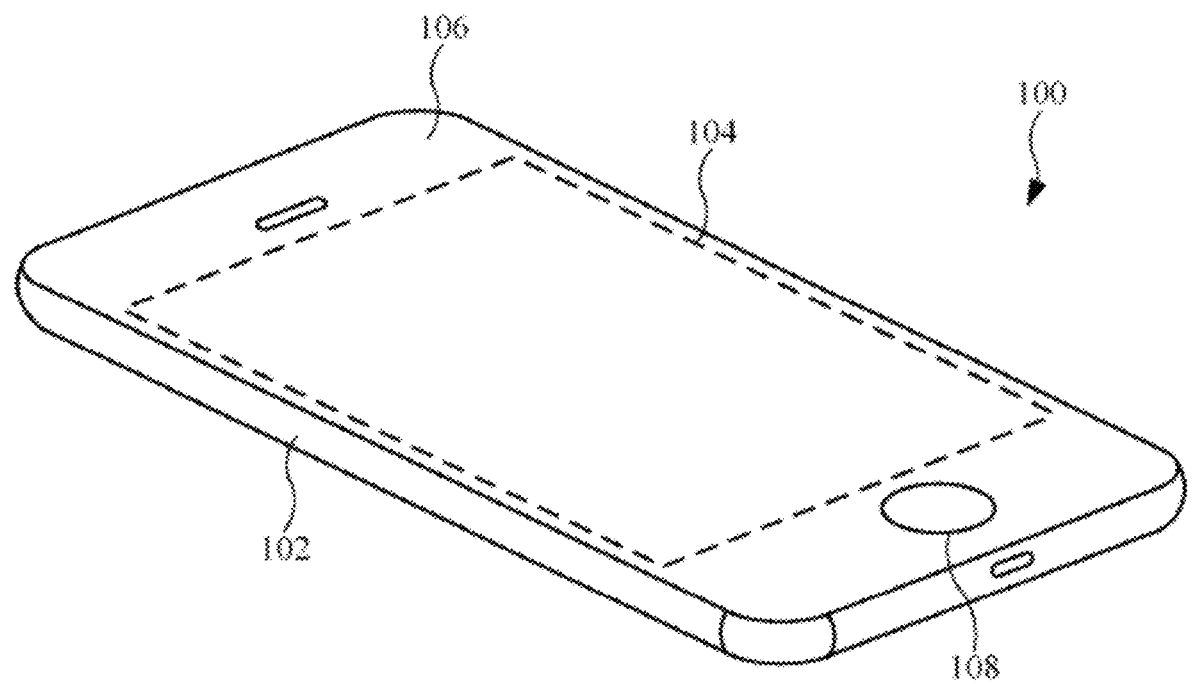
FIG. 1 shows a schematic perspective view of an electronic device according to some embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Wireless charging is a convenient feature for handheld products and smartphones. By incorporating charging coils in transmission and receiver devices, inductive charging can be performed, reducing many inconveniences associated with wired charging. The process of wireless charging can have challenges including heat generation, regulatory requirements regarding emissions, and charging efficiency, which can all impact performance. For example, during the charging process magnetic flux is emitted from both the transmission coil and the receiver coil. In many systems, ferrite is utilized to facilitate redirection of the flux to improve efficiency of distribution and collection. The ferrite provides this function by conducting the flux and directing it back towards the coil. However, as the ferrite continues to conduct flux, it may reach a saturation limit, which may reduce the efficiency of charging.

For many conventional systems, any number of additional materials may affect the process. For example, transmission and receiver coils may be or include a wound coil, which may resistively heat during charging operations, and may in turn heat surrounding components, which may affect operation of the device. Misaligned coils may also impact the charging efficiency of the system or components. Additionally, extraneous materials positioned proximate the charging operation may interfere with the charging. For example, materials like coins, paper clips, magnetic components, and even snack bags that may include a layer of aluminum or other metal, can absorb flux, and thereby reduce charging efficiency.

The present technology overcomes many of these issues by utilizing a nanocrystalline foil to facilitate charging and flux conduction. The material may be characterized by magnetic properties that may exceed that of ferrite used in conventional systems. For example, higher saturation of the nanocrystalline foil may reduce or overcome the impact of metal or magnetic materials proximate the charging operation. Additionally, the improved characteristics may allow a reduction in the amount of material utilized, which may allow larger coils to be used as will be discussed in detail further below. As form factors continue to shrink, utilizing materials according to some embodiments of the present technology may allow more complex design configurations that may include components that may limit or prevent usage of inductive charging with components of conventional technology.

Although the remaining portions of the description will routinely reference smart phones, it will be readily understood by the skilled artisan that the technology is not so limited. The present materials and technology may be employed with any number of electronic devices that may include, without limitation, phones and mobile devices, watches, glasses, and other wearable technology including fitness devices, handheld electronic devices, laptops, tablets, and other computers, as well as other devices that may benefit from the use of wireless charging technology.

FIG. 1 shows a schematic perspective view of an electronic device 100 according to some embodiments of the present technology. Electronic device 100 may illustrate a number of devices, which may include a mat, charging station, wireless rechargeable battery, personal computing device, or mobile device, for example. Additionally, electronic device 100 may be a tablet computing device, wearable electronic device, as well as a mobile communication device, such as a smartphone. Electronic device 100 may include an enclosure 102, or housing, that defines an internal cavity to receive several internal components, some of which will be described below, and which may include components such as a circuit board, processor circuit, memory circuit, charging coils, and an internal power supply, as non-limiting examples. The enclosure 102 may include a metal, such as aluminum or steel, or a metal alloy that includes two or more metals. Alternatively, the enclosure 102 may include a non-metal material or materials, such as ceramics, polymers, or other flexible materials including combinations of metal and non-metal materials.

The electronic device 100 may further include an active region 104 shown as a dotted line, although in some embodiments region 104 may be a coextensive portion of the enclosure 102. When present, active region 104 may include a charging surface, transfer surface, or a display surface designed to present visual information in the form of still images and/or video. The active region 104 may include a capacitive touch sensitive layer designed to receive a touch input to alter the visual information. Also, the electronic device 100 may include a protective cover 106 that overlays the active region 104, when present. The protective cover 106 may include a transparent material, such as glass or sapphire, as non-limiting examples, and may include EMF shielding materials, or other materials through which electronic transfer may occur. The electronic device 100 may further include a button 108 used as a control input to a processor circuit, not shown. For example, the button 108 may depress in response to a force, and may provide a control that alters the visual information presented by the active region 104. Additionally, although not shown, the electronic device 100 may include one or more buttons disposed along the enclosure 102 to provide one or more additional control inputs.

Figure 2:
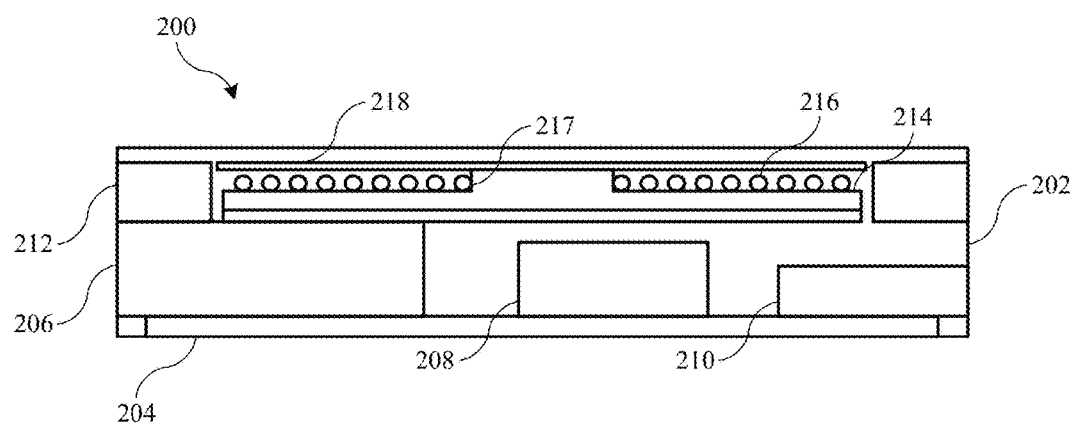
FIG. 2 shows a schematic cross-sectional view of an electronic device according to some embodiments of the present technology.

FIG. 2 shows a simplified schematic cross-sectional view of an electronic device 200 according to some embodiments of the present technology. It is to be understood that electronic device 200 is included merely to illustrate certain components according to some embodiments of the present technology, and is not intended to accurately represent either scale or position of components that may be incorporated in the device. Electronic device 200 may provide an exemplary cross-section of electronic device 100, where electronic device 100 may include a mobile computing device, or additional devices according to embodiments of the present technology. For example, electronic device 200 may include an enclosure 202 and graphical display assembly 204 as previously described. Within enclosure 202 may be a number of components as discussed above, and which may include a battery 206, a graphical processing unit 208, and an integrated circuit 210.

Battery 206 may be or include a rechargeable battery, including a number of rechargeable battery cells. Battery 206 may be a lithium-ion or other secondary battery type, and may be coupled with recharging circuitry and controllers operable to control charging and discharging operations. Integrated circuit 210 may be part of a circuit board, and may be a central processing unit, or other controller that may perform any number of operations within the electronic device, including operations related to wireless charging and discharging.

Additionally within enclosure 202 may be a support plate 212 that may include a number of components related to wireless charging. While previously mentioned components may be positioned between the support plate 212 and the graphical display assembly 204, certain components related to wireless charging may be positioned between or in line with the support plate and the back plate or rear of enclosure 202, including contacting or at least partially coupled with the rear of enclosure 202. These components may include a nanocrystalline foil 214 and a wireless charging coil 216.

Because of many mobile and other electronic devices having reduced form factors, ferrite may not provide adequate operational characteristics, as the ferrite may become thinner to accommodate device form factor restrictions. For example, to provide sufficient space for internal components, and more space intensive materials like a battery, which may improve capacity, the ferrite may be reduced to a thickness below a millimeter, or below half a millimeter, or reduced even more. As this reduction occurs, the ability of the ferrite to steer flux continues to degrade, until the ferrite saturates. At this point, it may no longer provide benefits of redirecting fields effectively, and the charging efficiency may continue to degrade. As efficiency drops, the time to charge increases, which may generate even more heat in the device. In many newer devices, an additional issue may be when charging operations occur with devices that may include one or more hard magnets. These hard magnets may be incorporated with drives or other internal components, and may also be included in other aspects as will be described below. Regardless, hard magnets emit their own flux, which when in close vicinity to the ferrite, will also be absorbed by the ferrite. This further adds to the flux absorbed by the ferrite, which can quickly reach saturation for the material. Accordingly, in space restrictive devices or any electronic device according to embodiments of the present technology, especially those that may include a hard magnet, ferrite may be removed from the system as a magnetic component, and the devices may use a nanocrystalline foil as will be described below.

Incorporated with the nanocrystalline foil 214 may be a wireless charging coil 216. When in a transmission operation, wireless charging coil 216 may receive current to generate an electromagnetic field. A receiving coil in a second device can receive power from this field and convert the power back into current that may charge a rechargeable battery of the second device. Integrated circuit 210 may be configured to operate the wireless charging coil in a wireless charging transmission mode, such as to charge components or accessories associated with the electronic device, as well as to provide charging to other electronic devices. In some embodiments, the integrated circuit may also be configured to operate the wireless charging coil in a wireless charging receiving mode. The integrated circuit 210 may operate the coil in either mode by any number of control mechanisms.

The wireless charging coil may be a single wire formed in a coil characterized by an annular shape as shown in cross-section in the figure. The annulus may include an inner annular radius 217, which may be defined from a central axis through the device, and which may define an interior volume or gap through the wireless charging coil. The gap may be characterized by any different geometry depending on the coil distribution, and may be characterized by a cylindrical volume as illustrated. The nanocrystalline foil, or a portion of the nanocrystalline foil, may extend through the cylindrical volume. An e-shield 218 may be positioned between the wireless charging coil 216 and the back wall of enclosure 202, and may extend laterally across the wireless charging coil 216 as well as the nanocrystalline foil extending through the wireless charging coil. The nanocrystalline foil may include multiple layers where a first layer defines a surface on which the wireless charging coil may be seated, and a second layer is positioned within the wireless charging coil centrally defined volume. Each of these layers may also include one or more layers as will be described further below. The nanocrystalline foil may form a recessed ledge on which the wireless charging coil may be formed, and may be a recessed annular ledge formed to accommodate the coil distribution.

The wireless charging coil may be formed of any number of metals or alloys that may be conductive, and may be characterized by a thickness of less than or about 250 µm in some embodiments, which may limit the use of space within device 200. Additionally, in some embodiments the wireless charging coil may be characterized by a thickness of less than or about 200 µm, less than or about 150 µm, less than or about 100 µm, less than or about 50 µm, or less. The thickness of the coil may be one of several competing factors that may be used to accommodate the form factor of electronic device 200. For example, increasing the thickness of coil 216, may then increase the thickness of the associated magnetic material, which may reduce space available for a battery. Additionally, reducing the thickness of the coil may provide more space within the housing, but may increase the resistance of the coil, which may increase heating during charging operations. Accordingly, in some embodiments the wireless charging coil may be characterized by a thickness greater than or about 20 µm, greater than or about 30 µm, greater than or about 40 µm, greater than or about 50 µm, greater than or about 60 µm, greater than or about 70 µm, or more. Another advantage of utilizing a nanocrystalline foil according to some embodiments of the present technology is that the foil may be characterized by a reduced thickness relative to ferrite, which may allow an increased coil thickness, while maintaining a similar or reduced overall form factor.

Figure 3:
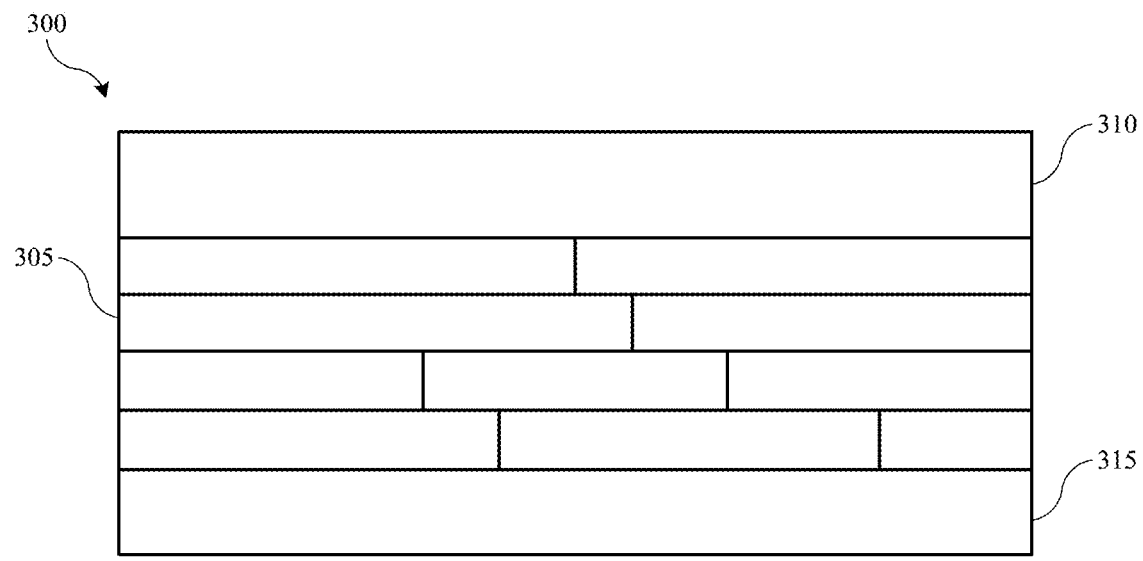
FIG. 3 shows a schematic cross-sectional view of a nanocrystalline material according to some embodiments of the present technology.

FIG. 3 shows a schematic cross-sectional view of a nanocrystalline material 300 according to some embodiments of the present technology. Nanocrystalline material 300 may be or include one or more layers 305 of a ferrosilicon-containing material or other magnetic material. The layers 305 may be fractured as illustrated, and may include a number of additional materials in some embodiments. For example, nanocrystalline materials according to the present technology may include iron silicide particles incorporated within an iron-containing matrix. The iron silicide may be characterized by a body centered cubic unit cell structure, and the particles may be incorporated within a matrix including any number of additional materials including niobium, boron, and other metals including transition metals that may adjust properties of the matrix. For example, copper may be incorporated within the matrix as well, and may be included in a face centered cubic unit cell structure. The material may include a range of silicon incorporation and may include silicon in an amount greater than or about 10% by weight, and may include silicon in an amount by weight greater than or about 20%, greater than or about 30%, greater than or about 40%, greater than or about 50%, greater than or about 60%, greater than or about 70%, greater than or about 80%, greater than or about 90%, or greater.

Nanocrystalline material 300 may include one or both of adhesive 310, which may allow the nanocrystalline material to have improved contact with adjacent materials, and structural support 315. Adhesives may be either structural or pressure-sensitive, and may include any number of adhesives that may couple the nanocrystalline film with adjacent materials which may include metal, ceramics, plastics, or other materials that may be included within an electronic device. The structural support 315 may include thermoplastics such as polyethylene terephthalate, or any other materials that may provide a base for the nanocrystalline foil. Each layer of nanocrystalline material 300 may be characterized by a thickness, which may produce an overall thickness of the nanocrystalline foil. Although four layers of the ferrosilicon-containing material are illustrated, it is to be understood that exemplary foils may include between about 2 layers and about 10 layers of material, and may include between about 3 layers and about 5 layers, and may include at least or about 2 layers, at least or about 3 layers, at least or about 4 layers, at least or about 5 layers, at least or about 6 layers, at least or about 7 layers, at least or about 8 layers, at least or about 9 layers, at least or about 10 layers, or more. In embodiments where two layers form a recessed ledge of nanocrystalline foil as previously described, such as including a second layer positioned within the volume defined by an annular wireless charging coil, each layer may include any number of layers, including any number of these identified ranges.

Each layer of the ferrosilicon-containing material within exemplary nanocrystalline foils may be characterized by a thickness of less than or about 100 µm, and may be characterized by a thickness of less than or about 90 µm, less than or about 80 µm, less than or about 70 µm, less than or about 60 µm, less than or about 50 µm, less than or about 40 µm, less than or about 30 µm, less than or about 20 µm, less than or about 10 µm, or less. Accordingly, depending on the number of layers, the nanocrystalline foil may be characterized by a thickness of less than or about 500 µm, and may be characterized by a thickness of less than or about 450 µm, less than or about 400 µm, less than or about 350 µm, less than or about 300 µm, less than or about 250 µm, less than or about 200 µm, less than or about 150 µm, less than or about 100 µm, or less. By utilizing materials including a nanocrystalline foil characterized by the thicknesses described, more space may be included within the enclosure of the electronic device for increased coil thickness, or additional space for other components.

Because of improved magnetic characteristics, nanocrystalline foils according to some embodiments of the present technology may be thinner than ferrites or other materials used in other technologies. The thinner the material used, the more the flux density within the material may increase. Accordingly, saturation may occur at lower flux densities, degrading charging efficiency, and leading to reduced performance or capability. Not only do nanocrystalline materials according to embodiments of the present technology improve on saturation, but the materials also reduce effects at operational frequencies. For example, wireless charging systems according to some embodiments of the present technology may operate at frequencies above or about 100 kHz, and may operate at frequencies above or about 110 kHz, above or about 120 kHz, above or about 130 kHz, above or about 140 kHz, above or about 150 kHz, or more, as well as up to or about 150 kHz, up to or about 140 kHz, up to or about 130 kHz, or less. Regulations around the world may provide limits on various characteristics related to frequency, including limits on the harmonic content at particular operating frequencies.

Unlike the nanocrystalline films according to the present technology, ferrites and other magnetic materials formed at comparable thicknesses described above may produce waveform distortion during charging operations. These distortions may result in a radiated field that has an increased harmonic content. Accordingly, regulations limiting particular emissions at certain frequencies may not be attainable with many conventional materials produced at the thicknesses described above. Nanocrystalline films according to some embodiments of the present technology may not produce distortion in these harmonics, such as the second harmonic. Accordingly, nanocrystalline materials according to some embodiments of the present technology may provide improved operating abilities as well.

Figure 4:
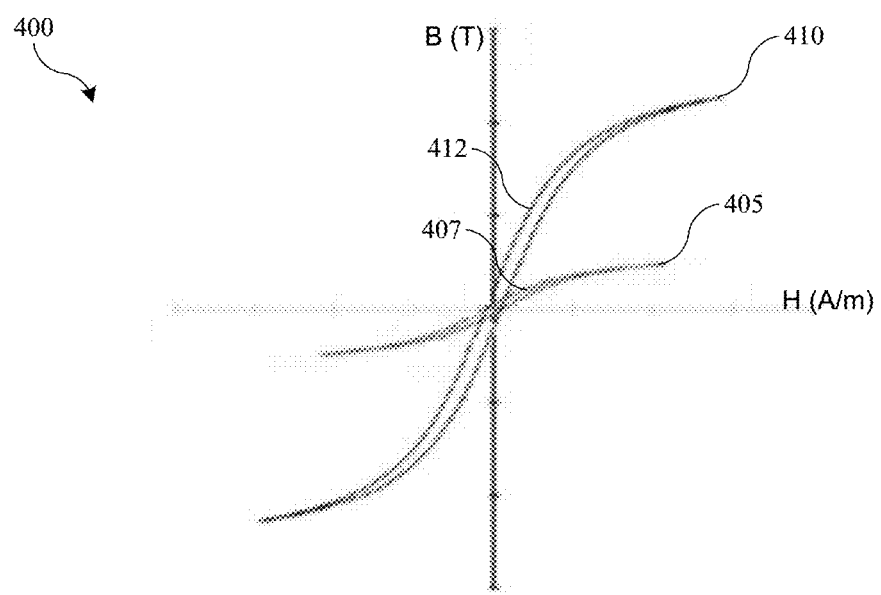
FIG. 4 shows a chart illustrating magnetic hysteresis loops of wireless charging components according to some embodiments of the present technology.

FIG. 4 shows a chart 400 illustrating magnetic hysteresis loops of wireless charging components according to some embodiments of the present technology. The loops illustrate the relationship of flux density against increasing field strengths. Loop 405 is shown for a ferrite material used in some conventional technologies, and loop 410 is shown for a nanocrystalline material according to some embodiments of the present technology. As illustrated, a saturation value ($B_{SAT}$) of ferrite may occur far below materials according to the present technology. While ferrite materials may saturate at a flux density of less than or about 300 mT, nanocrystalline films according to embodiments of the present technology may be characterized by a flux density saturation greater than or about 500 mT, and may be characterized by a flux density saturation greater than or about 600 mT, greater than or about 700 mT, greater than or about 800 mT, greater than or about 900 mT, greater than or about 1000 mT, greater than or about 1100 mT, greater than or about 1200 mT, or higher. As will be shown below, this may improve efficiency for transmission and reception under a variety of operational circumstances.

The slope of the loop relates to the permeability of the material. At operating frequencies of wireless charging systems of some embodiments of the present technology, the distributed inductance adjusts along the slope of the BH loop. For ferrite, where the material is close to saturation, the inductance may move further along the curve while the current is changing direction due to the plateau closer to saturation illustrated at position 407. This movement may produce increased harmonic content causing issues as described previously. In some systems, the permeability of the ferrite or other magnetic material may be less than or about 700 µ', and may be less than or about 600 µ', less than or about 500 µ', or less.

For nanocrystalline materials according to some embodiments of the present technology, because the saturation value occurs at higher field strength, the operating range of wireless charging systems may remain in a more linear slope, and be contained in a narrow range of field strength as illustrated at position 412. In some systems, the permeability of the nanocrystalline material may be greater than or about 800 µ', and may be greater than or about 900 µ', greater than or about 1000 µ', greater than or about 1100 µ', greater than or about 1200 µ', greater than or about 1300 µ', or greater. This may reduce harmonic content and limit waveform distortion during operation. As will be discussed further below, some devices may include hard magnets in the device, which may produce an additional amount of flux. Because of the properties of the nanocrystalline material, a greater amount of flux may be absorbed from the permanent magnets, which may further shift the inductance due to the increased field. Despite this detrimental increase, the inductance may remain in a more linear portion thereby limiting any distortion. Accordingly, nanocrystalline materials may be counterintuitively selected over more conventional materials despite that the materials draw more magnetic flux from external components compared to ferrite and other materials.

Figure 5:
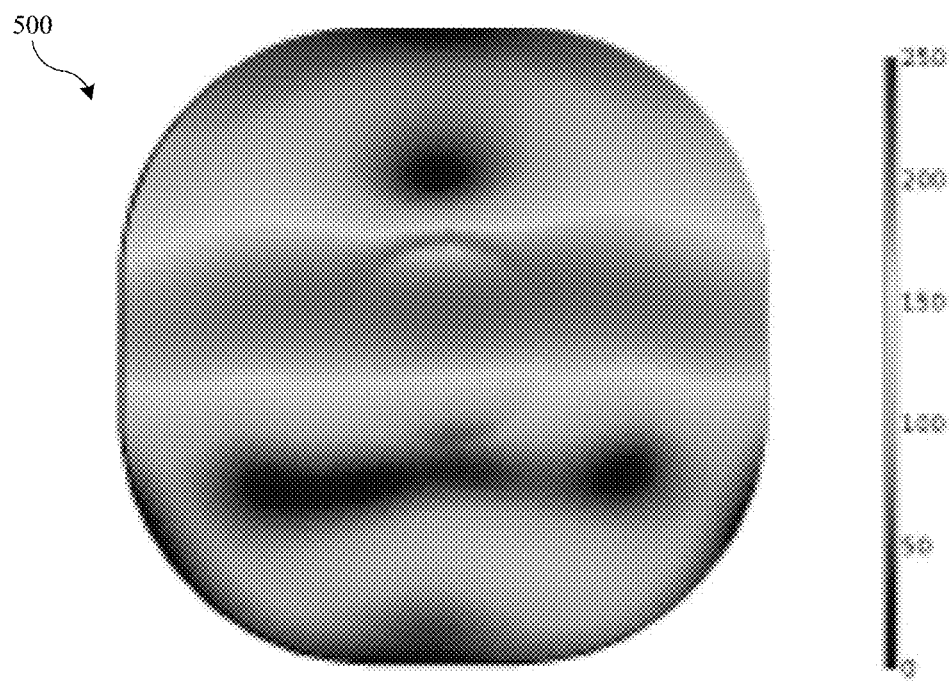
FIG. 5 shows a chart illustrating saturation of wireless charging component materials according to some embodiments of the present technology.

FIG. 5 shows a chart 500 illustrating saturation of wireless charging component materials according to some embodiments of the present technology. Chart 500 may illustrate the flux density in plane for a ferrite material during charging operations where the electronic device is operating in a receiving mode, and in which misalignment may occur between the transmitting and receiving coils, such as in systems providing positional freedom of the receiving coil or coils relative to one or more transmission coils. The figure illustrates that the ferrite fully saturates in some regions, indicating that in the saturated portions, it may no longer direct magnetic flux, which may then pass through the ferrite and interact with other internal components of the electronic device, causing heat generation.

Figure 6:
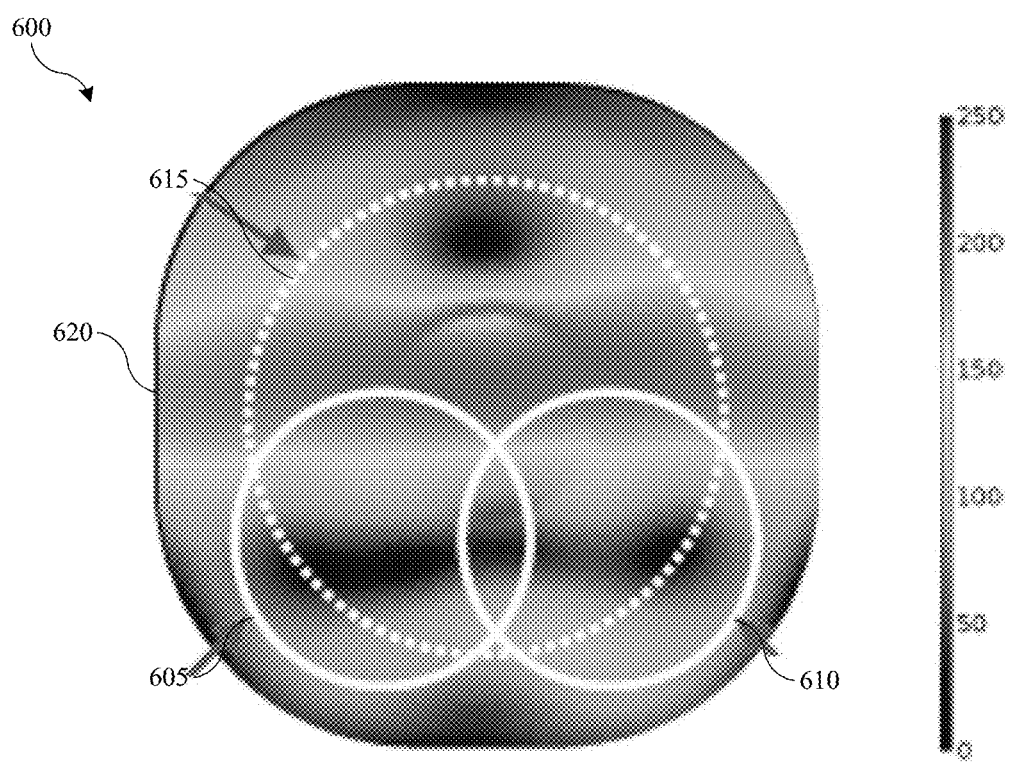
FIG. 6 shows a chart illustrating saturation of wireless charging component materials during a misaligned charging operation according to some embodiments of the present technology.

FIG. 6 shows a similar chart 600 illustrating saturation of wireless charging component materials during a misaligned charging operation according to some embodiments of the present technology. Chart 600 illustrates where two transmission coils 605, 610, do not fully overlap the receiver coil 615 overlying the ferrite. This misalignment causes constructive generation of flux that saturates the ferrite across section 620. To compensate for the losses caused by saturation, conventional technologies may further boost the current to the coil, further generating heat, which may still cause overall efficiency losses when temperature thresholds may be reached and charging must be halted.

Figure 7:
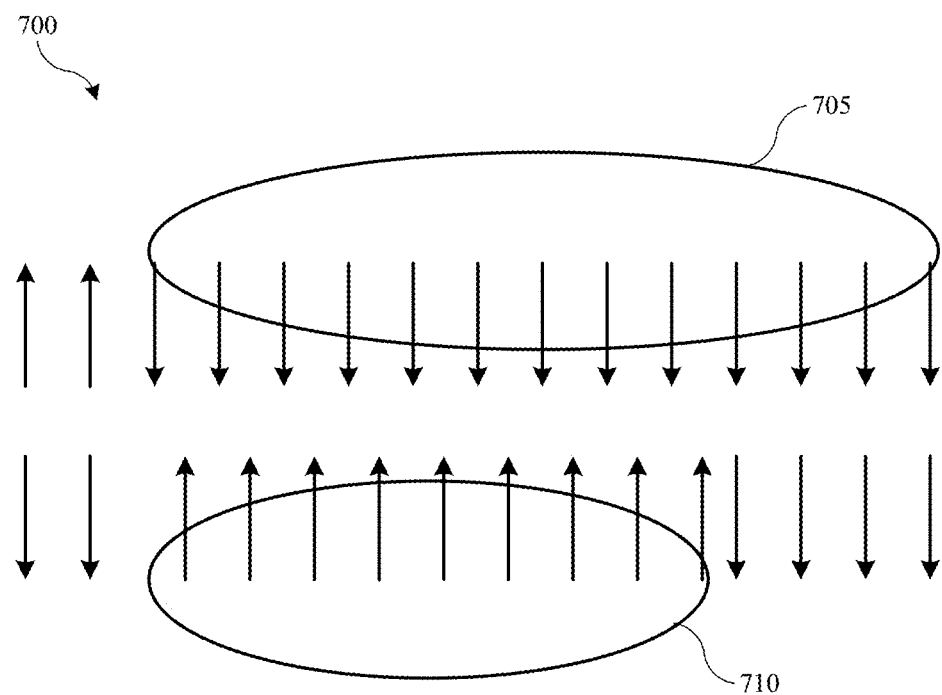
FIG. 7 shows a schematic illustration of destructive and constructive field effects during charging according to some embodiments of the present technology.

FIG. 7 shows a schematic illustration 700 of destructive and constructive field effects during misaligned charging according to some embodiments of the present technology. Similar to chart 600, illustration 700 shows a wireless charging coil 705 operating in a receiving mode relative to a wireless charging coil 710 operating as a transmitter. As shown, the misalignment affects the magnetic fields produced. For example, where the coils overlap, the fields operate destructively. However, where the coils are misaligned, the alignment produces a constructive generation of the fields, which may cause the increased flux density just outside of the overlapping region. Because of the constructive generation, the ferrite discussed above may fully saturate in this region, limiting the efficiency and the ability to direct any further flux.

Figure 8:
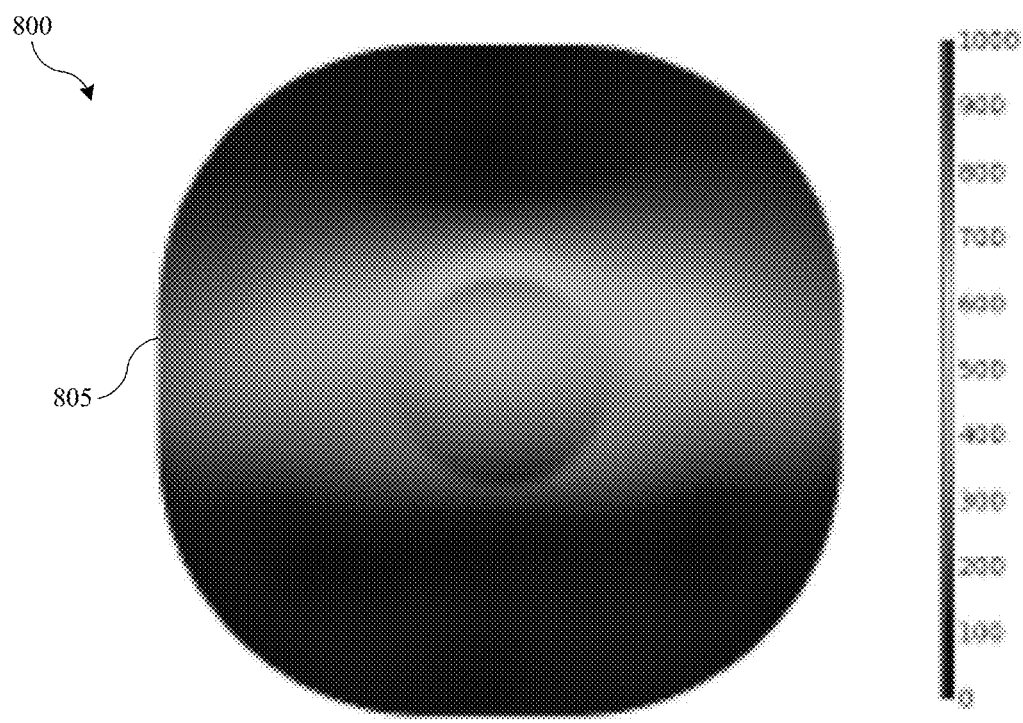
FIG. 8 shows a chart illustrating saturation of wireless charging component materials according to some embodiments of the present technology.

FIG. 8 shows a chart 800 illustrating flux density of wireless charging component materials during a misaligned charging operation according to some embodiments of the present technology. The chart illustrates a similar misalignment as described above with multiple transmission coils. As illustrated, the misalignment causes constructive generation just outside of the overlapping coils across region 805. However, due to the greater scope of the nanocrystalline foil, the increased flux is conducted without decreasing the operational ability of the material. Consequently, the efficiency of charging may be higher than the saturated ferrite, which may allow faster charging, reduced heat production, or both. Accordingly, in some embodiments nanocrystalline materials according to some embodiments of the present technology may operate during wireless charging in a misaligned position relative to a transmission coil, and may be configured to maintain a flux density below or about 80% of a saturation value during charging. Additionally, the foils may maintain a flux density below or about 75% of a saturation value during charging, and may maintain a flux density below or about 70% of a saturation value, below or about 65% of a saturation value, below or about 60% of a saturation value, below or about 55% of a saturation value, below or about 50% of a saturation value, below or about 45% of a saturation value, below or about 40% of a saturation value, below or about 35% of a saturation value, below or about 30% of a saturation value, below or about 25% of a saturation value, below or about 20% of a saturation value, below or about 15% of a saturation value, below or about 10% of a saturation value, or less.

FIGS. 9A-9B show schematic illustrations of chargeable devices according to some embodiments of the present technology. FIG. 9A illustrates a case 900, which may include a magnetically actuated lid 905. The lid may be a hinged lid connected with a body of the case 900, which may house one or more devices or accessories, such as earphones or other components. Case 900 may include one or more pairs of hard magnets, including magnets 910*a* and 910*b*, and magnets 912*a* and 912*b*. The case may include any number of pairs of magnets including greater than or about 2, 3, 4, 5, 6, 7, 8, 9 or more, which may operate to retain the hinged lid 905 closed via magnetic attraction between the pairs of magnets. The case may also include additional magnets, which may secure internal devices or accessories, operate to determine if the lid is closed, such as with a Hall effect sensor, or other magnets incorporated within the device. FIG. 9B illustrates an additional device 950, which may be a watch, fitness device, or other wearable device, which may also include a magnet 955 including for coupling with a dock or other component. Device 950 may also include a wireless charging coil 960, and in some embodiments may also include a nanocrystalline foil 965 as previously described. It is to be understood that the schematics are intended to be representative of components that may be included, and which may be included in a variety of orientations and positions. As explained above, the hard magnets in these electronic devices may cause additional magnetic flux, which may be absorbed by the nanocrystalline foil. By utilizing nanocrystalline foils according to embodiments of the present technology, the additional flux may not affect operation of the charging, where saturation of conventional components may occur.

FIG. 10 shows a schematic cross-sectional view of a wireless charging system 1000 according to some embodiments of the present technology. The charging system is illustrated with case 900 discussed above, but the figure may include any other device discussed throughout the present disclosure, including a device similar to the device transmitting. As illustrated, system 1000 may include a first electronic device 1010 shown in a simplified form, but which may be similar to any of the electronic devices previously described, including a phone, tablet, or other device, and may include any of the components of electronic devices 100 or 200, as well as any of the material characteristics previously described. First electronic device 1010 may include a nanocrystalline foil 1015 on which a first wireless charging coil 1020 is seated. As previously discussed, an integrated circuit may operate the first wireless charging coil in a transmission mode.

System 1000 may also include a second electronic device, such as case 900, although any previously described device may similarly be charged. Case 900 may include a second wireless charging coil 1025, which may be configured to operate in a receiving mode. In some embodiments, case 900 may include a nanocrystalline material 1030 as well. Case 900 may include hard magnets 910, which may further generate magnetic flux during operation, and which may increase flux density in the nanocrystalline materials. The nanocrystalline materials may be characterized by increased capacities allowing the materials to accommodate increased flux densities even in reduced form factors, and thinner materials. It is to be understood that the system illustrated is for explanation only, and components may be positioned differently, while still operating similarly. By utilizing nanocrystalline materials according to the present technology, improved efficiency and operation may be afforded, while providing increased scope of operation including when other magnetic components are incorporated in electronic devices, and which may cause ferrite materials of conventional technologies to saturate, and degrade in performance.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the layer" includes reference to one or more layers and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A first electronic device comprising:
an enclosure including a back wall, the back wall having an outer surface to receive a second electronic device for wireless power transfer between the first electronic device and the second electronic device;
an electronic component positioned within the enclosure;
a first wireless power coil positioned within the enclosure and between the electronic component and the back wall; and
one or more layers of nanocrystalline material positioned between the electronic component and the first wireless power coil to direct magnetic flux at the first wireless power coil away from the electronic component,
wherein the magnetic flux at the first wireless power coil is generated at least in part by a magnet in the second electronic device.

2. The first electronic device of claim 1 further comprising an e-shield positioned between the first wireless power coil and the back wall.

3. The first electronic device of claim 2 wherein the magnetic flux at the first wireless power coil is generated at least in part by a second wireless power coil in the second electronic device.

4. The first electronic device of claim 3 wherein the magnetic flux at the first wireless power coil is generated using the electronic component of the first electronic device.

5. The first electronic device of claim 3 wherein the magnetic flux at the first wireless power coil is further generated at least in part by a magnet in the second electronic device.

6. The first electronic device of claim 3 wherein the one or more layers of nanocrystalline material increases an inductive coupling between the first wireless power coil and the second wireless power coil.

7. The first electronic device of claim 1 wherein the electronic component is one of an integrated circuit and a battery.

8. The first electronic device of claim 1 wherein the one or more layers of nanocrystalline material comprise one or more layers of a magnetic material.

9. The first electronic device of claim 1 wherein the one or more layers of nanocrystalline material comprise one or more layers of a ferrosilicon-containing material.

10. The first electronic device of claim 1 further comprising a layer of adhesive on a first surface of the one or more layers of nanocrystalline material.

11. The first electronic device of claim 1, wherein the one or more layers of nanocrystalline material are configured to remain below a saturation limit during wireless power transfer between the first electronic device and the second electronic device.

12. An electronic system comprising:
a first electronic device comprising:
an enclosure;
a first wireless power coil positioned within the enclosure; and
one or more first layers of nanocrystalline material positioned along a surface of the first wireless power coil; and
a second electronic device comprising:
an enclosure having a back wall, the back wall having an outer surface to receive the first electronic device;
an electronic component positioned within the enclosure;
a second wireless power coil positioned within the enclosure to transfer power with the first wireless power coil of the first electronic device when the second electronic device is received at the outer surface of the back wall of the enclosure; and
one or more second layers of nanocrystalline material, wherein the one or more first layers of nanocrystalline material and the one or more second layers of nanocrystalline material increase an inductive coupling between the first wireless power coil and the second wireless power coil,
wherein the one or more second layers of nanocrystalline material are configured to remain below a saturation limit during wireless power transfer between the first electronic device and the second electronic device.

13. The electronic system of claim 12 wherein the second electronic device further comprises an e-shield positioned between the second wireless power coil and the back wall of the enclosure.

14. The electronic system of claim 13 wherein the one or more second layers of nanocrystalline material direct magnetic flux at the second wireless power coil away from the electronic component.

15. The electronic system of claim 14 wherein the first electronic device further comprises a magnet, and wherein the magnetic flux at the second wireless power coil is generated at least in part by the magnet in the first electronic device.

16. The electronic system of claim 15 wherein the magnetic flux at the second wireless power coil is further generated at least in part by the first wireless power coil in the first electronic device.

17. The electronic system of claim 13, wherein the one or more first layers of nanocrystalline material comprise a plurality of layers of a ferrosilicon-containing material.

18. A charging module comprising:
a wireless power coil extending laterally and having a top surface and a bottom surface, the top surface opposite the bottom surface; and
one or more layers of nanocrystalline material positioned along a bottom surface of the wireless power coil,
wherein the one or more layers of nanocrystalline material are configured to direct magnetic flux at the one or more layers of nanocrystalline material towards the wireless power coil when the charging module is included in a first electronic device and is used to charge the first electronic device,
wherein the magnetic flux at the wireless power coil is generated at least in part by a magnet in a second electronic device.

19. The charging module of claim 18, wherein the one or more layers of nanocrystalline material are configured to remain below a saturation limit during wireless power transfer to the first electronic device.

20. The charging module of claim 18 further comprising an e-shield along a top surface of the wireless power coil and a layer of adhesive on a top surface of the one or more layers of nanocrystalline material.

* * * * *